US010308538B2

(12) United States Patent
Wright

(10) Patent No.: US 10,308,538 B2
(45) Date of Patent: *Jun. 4, 2019

(54) APPARATUS FOR SEPARATING MATERIALS FROM AN INFLUENT STREAM

(71) Applicant: ClearCove Systems, Inc., Rochester, NY (US)

(72) Inventor: Terry Wright, Rochester, NY (US)

(73) Assignee: ClearCove Systems, Inc., Victor, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/503,455

(22) Filed: Oct. 1, 2014

(65) Prior Publication Data

US 2016/0096758 A1     Apr. 7, 2016

(51) Int. Cl.
   *C02F 11/04*     (2006.01)
   *C02F 1/00*      (2006.01)

(52) U.S. Cl.
   CPC ........ *C02F 11/04* (2013.01); *C02F 2001/007* (2013.01); *C02F 2209/40* (2013.01);
   (Continued)

(58) Field of Classification Search
   CPC ........ B01D 21/00; B01D 21/24; B01D 21/30; B01D 21/34; C02F 1/00; C02F 11/04;
   (Continued)

(56) References Cited

U.S. PATENT DOCUMENTS

| 1,493,861 A | 5/1924 | Kusch |
| 2,913,114 A | 11/1959 | Plaven |

(Continued)

FOREIGN PATENT DOCUMENTS

| GB | 1073383 A | 6/1967 |
| WO | 2011087936 A2 | 7/2011 |
| WO | 2014016797 A1 | 1/2014 |

OTHER PUBLICATIONS

Communication: Extended European Search Report, dated Jan. 3, 2016. pp. 1-31.

(Continued)

*Primary Examiner* — Robert Clemente
*Assistant Examiner* — Akash K Varma
(74) *Attorney, Agent, or Firm* — Harris Beach PLLC; Neal L. Slifkin

(57) ABSTRACT

A system comprising method and apparatus for separating biologically-digestible materials from an influent sewage stream. The system may comprise a primary clarification tank to capture sixty percent or more of the total solids from an influent stream; a sludge classifying press (SCP) to isolate and concentrate biologically digestible materials from sludge formed in the primary clarification tank, releasing valuable organics, such as are found in corn kernels, by fracturing the protective casings; a grit capture mechanism in a chamber within the primary clarification tank and isolated from the bulk of the sludge containing biologically-degradable materials; a grit trap to remove grit from the sludge prior to classifying the sludge with the SCP; apparatus for adding thickener to the sludge after classification and prior to digestion; and automation of one or more elements of the process for separating and digesting the biologically digestible materials in an influent stream.

12 Claims, 12 Drawing Sheets

(52) U.S. Cl.
CPC ...... *C02F 2303/06* (2013.01); *C02F 2303/24* (2013.01); *Y02E 50/343* (2013.01); *Y02W 10/23* (2015.05)

(58) Field of Classification Search
CPC .............. C02F 2209/02; C02F 2209/06; C02F 2209/08; C02F 2209/10; C02F 2209/11; C02F 2303/06; C02F 2303/24; Y02W 10/23
USPC .......... 210/143, 170.08, 109, 137, 299, 313, 210/359, 411, 533, 534, 122, 295, 242.1, 210/776, 532.1, 523, 801, 803
See application file for complete search history.

(56) References Cited

U.S. PATENT DOCUMENTS

| | | | |
|---|---|---|---|
| 3,394,814 | A | 7/1968 | Albertson |
| 4,224,157 | A | 9/1980 | Jain |
| 4,781,823 | A | 11/1988 | Shinozaki |
| 5,503,747 | A | 4/1996 | Vion et al. |
| 6,010,631 | A | 1/2000 | Delsalle et al. |
| 6,291,232 | B1 | 9/2001 | Miller, III |
| 6,964,737 | B2 | 11/2005 | Abu-Orf et al. |
| 7,972,505 | B2 * | 7/2011 | Wright ............... B01D 21/0006 210/109 |
| 8,038,881 | B2 | 10/2011 | Amir |
| 8,398,855 | B1 | 3/2013 | Pedros |
| 8,721,889 | B2 | 5/2014 | Conner et al. |
| 2006/0060525 | A1 | 3/2006 | Hoffland |
| 2006/0237364 | A1 * | 10/2006 | Gotthardsson .......... C02F 11/12 210/613 |
| 2006/0256645 | A1 * | 11/2006 | Jensen .................. B01F 5/0663 366/131 |
| 2006/0289356 | A1 | 12/2006 | Burnett et al. |
| 2007/0000836 | A1 | 1/2007 | Elefritz, Jr. |
| 2008/0199943 | A1 | 8/2008 | Widmer et al. |
| 2009/0209025 | A1 | 8/2009 | Goschi |
| 2010/0193416 | A1 | 8/2010 | Barbaro et al. |
| 2010/0264084 | A1 | 10/2010 | Midorkawa |
| 2010/0267102 | A1 | 10/2010 | Begin et al. |
| 2011/0089105 | A1 | 4/2011 | Liu |
| 2011/0297016 | A1 * | 12/2011 | Yamashita ............. B01D 29/35 100/145 |
| 2012/0024781 | A1 * | 2/2012 | Lugo ....................... C02F 11/04 210/613 |
| 2012/0125860 | A1 | 5/2012 | Xia |
| 2012/0261338 | A1 * | 10/2012 | Kuzma ................. C02F 1/5254 210/631 |
| 2013/0081934 | A1 | 4/2013 | New |
| 2014/0042086 | A1 | 2/2014 | Weber et al. |
| 2014/0263100 | A1 * | 9/2014 | Kumar ................ C05F 17/0018 210/770 |
| 2014/0305865 | A1 | 10/2014 | Dimassimo |

OTHER PUBLICATIONS

Manufacturer's data sheet, "HUBER Sludgecleaner STRAINPRESS" (attached hereto), disclosed at specification paragraph [0048], as found at: http://www.huber-technology.com/products/sludge-treatment/sludge-screening/huber-sludgecleaner-strainpressr.html.

Lester O. Pordesimo et al. "Processing cotton gin trash to enhance in vitro dry matter digestibility in reduced time," Department of Biosystems Engineering and Environmental Science, The University of Tennessee, 2506 E.J. Chapman Drive, Knoxville TN 37996-4531 USA and Department of Animal Science, The University of Tennessee, 2505 River Drive, Knoxville TN 37996-4500 USA, Bioresource Technology 96 (2005) 47-53. Available online at www.sciencedirect.com. Apr. 13, 2004.

* cited by examiner

APPARATUS FOR SEPARATING MATERIALS FROM AN INFLUENT STREAM

TECHNICAL FIELD

The present invention relates to systems for processing sewage; more particularly, to such systems for handling biologically digestible materials in sewage; and most particularly to methods and apparatus for separating biologically-digestible materials from an influent sewage stream.

BACKGROUND OF THE INVENTION

The primary historical objective of waste water treatment operations has been to neutralize and otherwise render sewage effluence in compliance with regulatory limits based on environmental and health standards. An important and growing objective of modern waste water treatments is the generation of energy from biologically-digestible organic materials present in the waste water. To achieve this objective, during the treatment of waste water influent streams containing biologically-digestible materials, as part of selectively classifying and separating grits, solids, hair and fibers, particulates, and solvated materials, it is particularly desirable to separate the digestible materials in the influent stream from non-digestible materials such that digestion of the digestible materials can be optimized. For systems that produce sludge in processes downstream from primary clarification (i.e., secondary sludge), it is desirable to extract the remaining biologically-digestible materials present in that sludge. Optimization can include increasing and capturing the bio-gas producing materials; production of energy bearing bio-gasses such as methane, produced by the decomposition of the digestible materials; reducing the frequency with which digesters used to digest the digestible materials need to be taken off line and cleaned; automation of the process for separating the digestible materials in the influent stream for digestion to reduce operating costs; reducing energy consumption-related operating costs; reducing the particle size of organic materials to allow rapid biodegradation and to capture organics prior to conversion to carbon-dioxide and biomass; and reducing the capital costs to build a treatment facility to separate and digest biologically-digestible materials in an influent stream.

In the prior art, the separation of grit from waste water influent is a long standing problem. Grit adversely impacts equipment reliability and lifespan, and increases operating costs of downstream treatment processes. Consequently, grit separators traditionally are used to remove grit from the influent stream as early in the treatment sequence as possible, preferably prior to primary clarification, or in cases where no primary clarification exists, then prior to secondary treatment. In practice, these devices often perform poorly because they are designed for a specific flow range which often is based on peak flows based on projected increases in population or a specific maximum flow based on storm events or future expansion of flows from new industries, etc. The projected flow range frequently is not reached for a number of reasons, such as unanticipated changes in population; changes in economic conditions of a region causing industries to leave or never develop; increased inflow and infiltration ("I and I") of water into the treatment system from deteriorating collection systems; and the increase in storm intensities.

In many treatment plants, in an attempt to provide flow equalization at the head of the plant, variable frequency drives have been added to control the pumps delivering influent to the treatment plants from wet wells used as buffers. The variable frequency drives enable operation of the pumps over a range of pump speeds rather than a single speed with the only control option being to turn them off and on. In practice, these variable frequency drives create large fluctuations in influent velocity that can hinder the performance of the highly velocity-sensitive hydrocyclone grit separators. Due to their poor performance, these velocity sensitive grit separators often fail and/or are left in disrepair, requiring grit to be removed from the influent stream as a component of the sludge formed during the primary-treatment process. Typically, the grit slowly fills the secondary treatment process tanks, contributing to reduced energy content of the primary sludge, increasing the frequency with which digesters and secondary process tanks must be cleaned, and causing wear and tear on the plant equipment.

Current typical waste water plants capture only thirty to thirty-five percent of the biologically-digestible materials during primary clarification. The remainder of the biologically-digestible materials are typically digested during secondary treatment in an activated sludge process that permits the greenhouse gas ($CO_2$) to escape into the atmosphere.

SUMMARY OF THE INVENTION

Briefly described, a system in accordance with the present application comprises a method and apparatus for separating biologically digestible materials from an influent sewage stream.

In one aspect of the present application, a primary clarification tank is used to capture sixty percent or more of the total solids from an influent stream.

In another aspect of the present application, a sludge classifying press (SCP) is used to isolate and concentrate biologically-digestible materials from sludge formed in a primary clarification tank, releasing valuable organics, such as are found in corn kernels, by fracturing the protective casings.

In another aspect of the present application, grit is captured in a chamber within the primary clarification tank and isolated from the bulk of the sludge-containing biologically-degradable materials.

In another aspect of the present application, a grit trap or hydrocyclone is used to remove grit from the sludge prior to classifying the sludge with the SCP.

In another aspect of the present application, the sludge is thickened after classification and prior to digestion.

In another aspect of the present application, one or more elements of the process for separating and digesting the biologically-digestible materials in an influent stream is automated.

BRIEF DESCRIPTION OF THE DRAWINGS

The present invention will now be described, by way of example, with reference to the accompanying drawings, in which.

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

Figure 1:
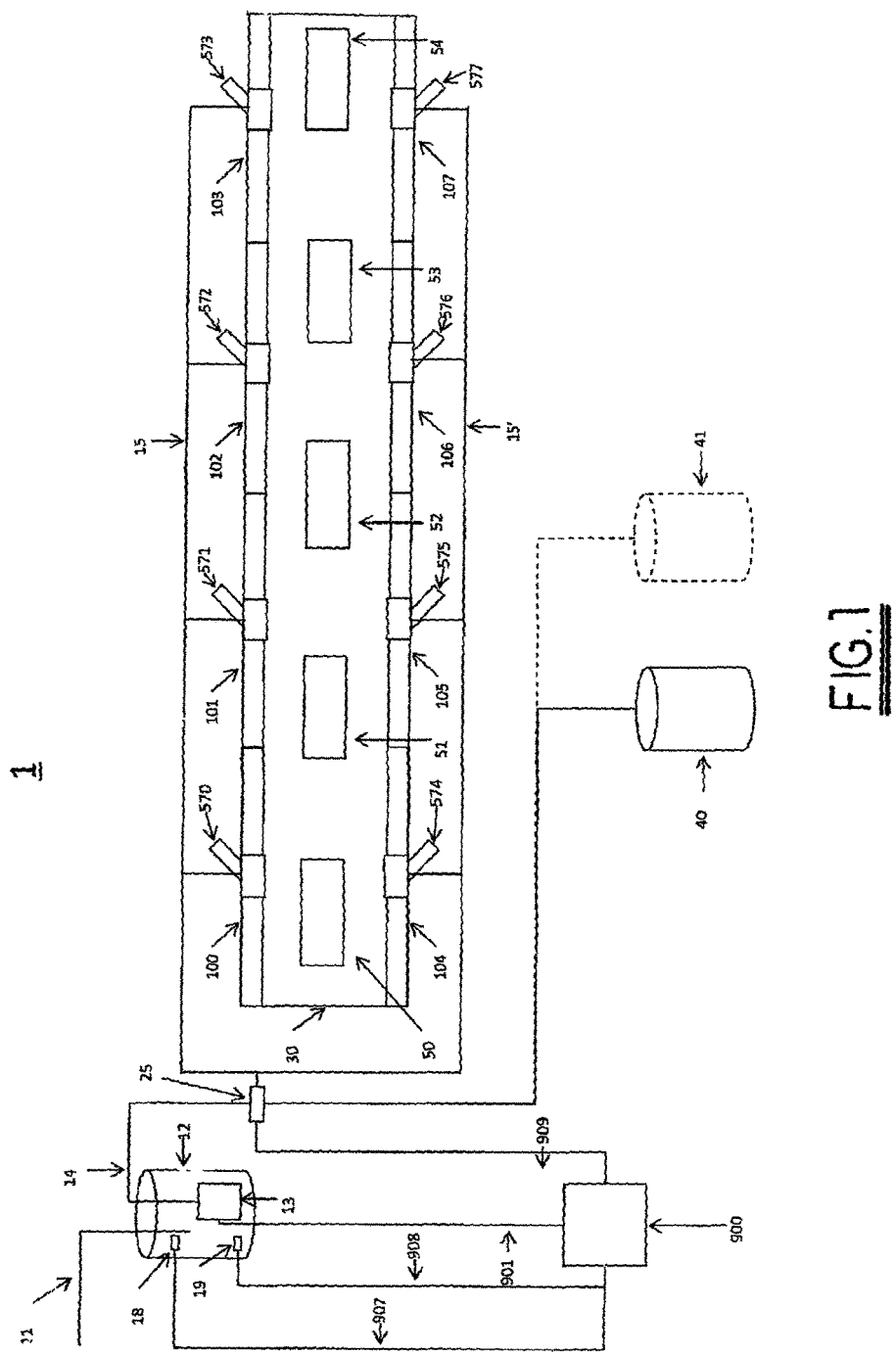
FIG. 1 is a schematic drawing of an embodiment of a water treatment plant in accordance with the present application.

U.S. Pat. No. 7,972,505, PRIMARY EQUALIZATION SETTLING TANK, to Wright; U.S. Pat. No. 8,225,942 to Wright, SELF-CLEANING INFLUENT FEED SYSTEM FOR A WASTEWATER TREATMENT PLANT; U.S. Pat. No. 8,398,864 SCREENED DECANTER ASSEMBLY FOR A SETTLING TANK to Wright; co-pending U.S. patent application Ser. No. 14/142,197 METHOD AND APPARATUS FOR A VERTICAL LIFT DECANTER SYSTEM IN A WATER TREATMENT SYSTEM by Wright; co-pending U.S. patent application Ser. No. 14/142,099 FLOATABLES AND SCUM REMOVAL APPARATUS FOR A WASTE WATER TREATMENT SYSTEM by Wright, and co-pending U.S. patent application Ser. No 14/325,421 IFS AND GRIT BOX FOR WATER CLARIFICATION SYSTEMS by Wright (the '421 application), all of which are incorporated by reference in their entirety for all purposes, disclose systems and processes for primary clarification that remove substantially all grit, solids, and particulates larger than 50 microns during primary clarification. Separation of Biologically Digestible Materials from the Influent Stream FIG. 1 shows a block diagram of one exemplary embodiment of a clarification system 1 configured to separate biologically-digestible materials from an influent stream. In one embodiment, the influent enters the clarification system 1 via pipes 11 where it is stored in wet well 12. A settling tank 30 is in fluid communication with eight IFS's, 100-107. Pump 13 pumps influent from wet well 12 to IFS's 100-107 at a substantially constant flow rate via piping 14, 15 and 15'. In one embodiment, pump 13 operates under the control of a supervisory control and data acquisition system (SCADA) 900 in communication with pump 13 via communication channel 901. In one embodiment, the SCADA 900 turns pump 13 in response to an indication of wet well 12 fluid level reaching an upper limit, the indication provided by sensor 18 in communication with SCADA 900 via communication channel 907. In one embodiment, SCADA 900 turns pump 13 off in response to an indication of wet well 12 fluid level reaching a lower limit, the indication provided by sensor 19 in communication with SCADA 900 via communication channel 908. In an alternative embodiment, SCADA 900 turns pump 13 off after a pre-determined period of time. In an alternate embodiment, SCADA 900 turns pump 13 off after a predetermined volume of fluid has been pumped as indicated by measuring the flow via signals provided by flow meter 25 in communication with SCADA 900 via communication channel 909. Flow meters and sensors to measure fluid level are well known in the art.

As is well known in the art, pipes 14, 15 and 15' are configured to deliver substantially the same flow rate of influent to each IFS 100-107. Flow balancing valves and/or flow splitting may be used. The influent enters the IFS's 100-107 where grits, solids, and optionally solvated materials, are selectively classified and separated from the influent via settling and optionally flocculation. Materials settled in the IFS's 100-107 are removed via discharge pipes 570-577 as described in more detail with reference to FIG. 5. The influent traverses IFS's 100-107 to enter clarification settling tank 30. As described in the '505 and '864 patents and '197 application, solids remaining in the influent traversing to the clarification settling tank 30 are further classified and separated from the influent via settling. Upon completion of the separation of the solids from the influent, the influent is discharged from the settling tank 30 using screen box assemblies (SBX's) 50-54 as described in the '197 application.

In the embodiment of FIG. 1, flocculents are optionally added to the influent stream by flocculent delivery systems 40, 41. The use of flocculents, for the removal of solids and solvated materials in the treatment of waste water and designs to add flocculents to an influent waste water stream, is well known in the art.

Figure 2:
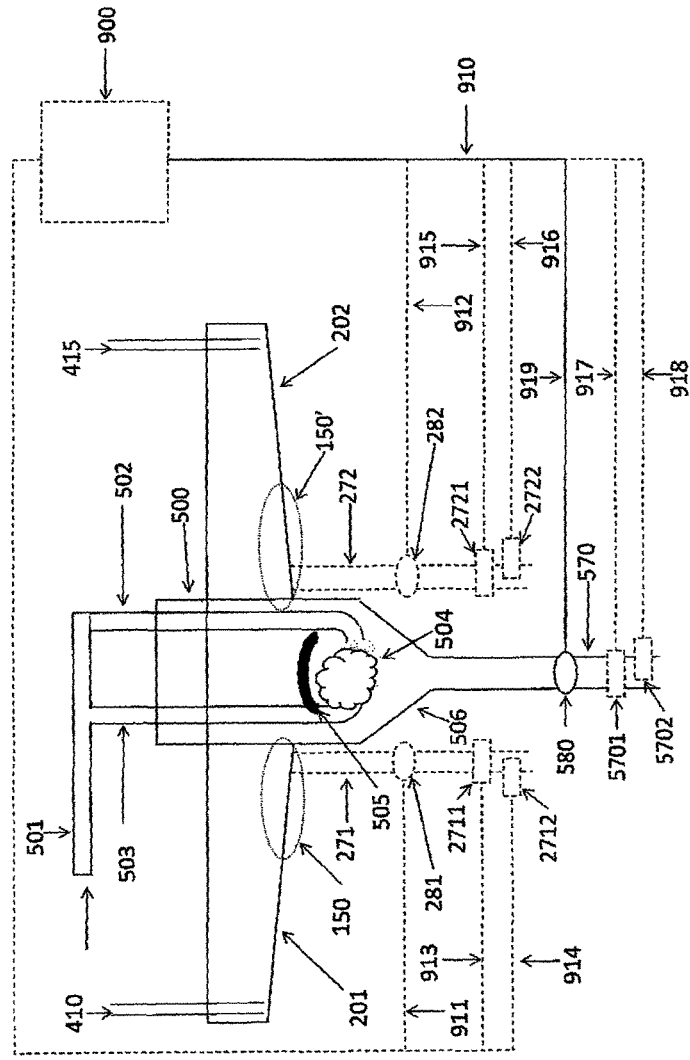
FIG. 2 is a schematic drawing and elevational side view of an Influent Feed System (IFS) used in the embodiment shown in FIG. 1.
Figure 3:
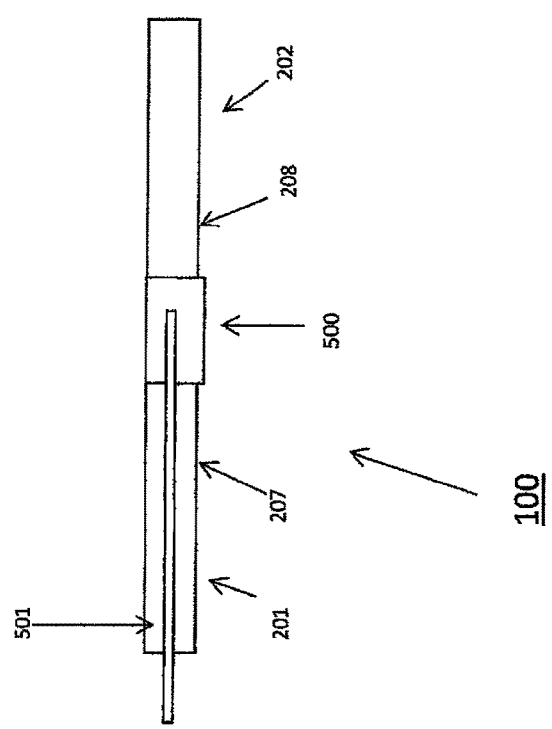
FIG. 3 is a detailed plan view of one IFS shown in FIG. 1.

FIG. 2 shows a side view of an exemplary IFS 100 with IFS troughs and grit box 500 and FIG. 3 shows a top view of the IFS of FIG. 2, as further described and disclosed in the '421 application. As described in more detail in the '421 application, a mixing zone 504 is created within a grit box 500 at the location where deposition of the floc is desired. With reference to FIG. 2 and FIG. 3, IFS 100 is configured with a grit box 500 and two IFS troughs 201, 202 having trough walls 207, 208. IFS troughs 201, 202 are in fluid communication with the grit box 500. Influent is delivered to IFS 100 via pipe 501 and is split into two streams which enter grit box 500 via pipes 502, 503. The streams exit opposing pipes 502, 503 and collide under pressure to create turbulent mixing zone 504. A deflector plate 505 is positioned above mixing zone 504 to confine the volume of the mixing zone and return the upward velocities of the streams existing pipes 502, 503 back into mixing zone 504. Grit, dense solids, and flocs are deposited in grit box hopper 506.

To limit disturbance of solids settling in the lower portion of IFS troughs 201, 202 in proximity to the grit box 500, the length of pipes 502, 503 is arranged to position mixing zone 504 below the lowest portion of IFS troughs 201, 202 in proximity to and in fluid communication with grit box 500. Mixing zone 504 and grit box hopper 506 are positioned below the lowest portion 150, 150' of IFS troughs 201, 202 in proximity to and in fluid communication with grit box 500. Solids with a lower settling rate than the designed influent rise velocity in the grit box hopper 506 move into IFS troughs 201, 202. Additionally, prior to entering IFS troughs 201,202, solids moving upward under the influence of the rising influent undergo a 90 degree change in direction, turning from vertical to horizontal thus losing inertia and lessening the fluid forces on the suspended grits, solids, and flocs. In one embodiment, as explained in more detail below, grits settle preferentially in grit box 500.

Materials that settle in grit box 500 and clarification tank 30 may be removed as part of periodic scouring of grit box 500 and clarification tank 30 or as part of the ongoing operation of clarification system 1 to selectively classify and separate grits, solids, particulates, and solvated materials from an influent stream.

Other methods may be used to separate and capture large quantities of biologically digestible material from an influent stream. By way of example and not limitation, with reference to FIG. 4, large quantities of solids, suspended materials, and solvated materials can be rapidly settled from an influent stream by a prior art system such as CLARI-FLOCCULATOR packaged sewage treatment 1100 for primary treatment manufactured by Waterneer, a company with offices in Lidköping Sweden. In the Waterneer primary treatment system, inlet feed pump 1102 is in fluid communication with influent stream 1101 and mixing chamber 1103. Flocculent source 1106 is in fluid communication with mixing chamber 1103. Mixing chamber 1103 is in fluid communication with turbulence redirection apparatus 1104 which is in fluid communication with sedimentation chamber 1105. Sedimentation chamber 1105 further comprises a sludge discharge pipe 1111, a sensor 1108 in communication with programmable controller 1107, and valve 1109 under control of and in communication with programmable controller 1107. Valve 1109 is positioned in sludge discharge pipe to control fluid communication of materials from sedimentation chamber 1109 through sludge discharge pipe 1111.

In the Waterneer primary treatment system, inlet feed pump 1102 pumps water from influent stream 1101 into a mixing chamber 1103 where it is mixed with flocculents added to the influent stream by flocculent source 1106. The influent and flocculent mix is delivered to turbulence redirection apparatus 1104 to slow the velocity of the fluid after which it is delivered to sedimentation chamber 1105 where flocs, grits and other materials settle. Effluent 1110, free of the settled materials, is evacuated from primary treatment system 1100. Programmable controller 1106 opens and closes valve 1109 responsive to signals from sensor 1108 indicating that the thickness of the sludge settled in sedimentation chamber 1105 has exceeded a predetermined threshold. Sludge from sedimentation chamber 1105 is evacuated via discharge pipe 1111.

Figure 5:
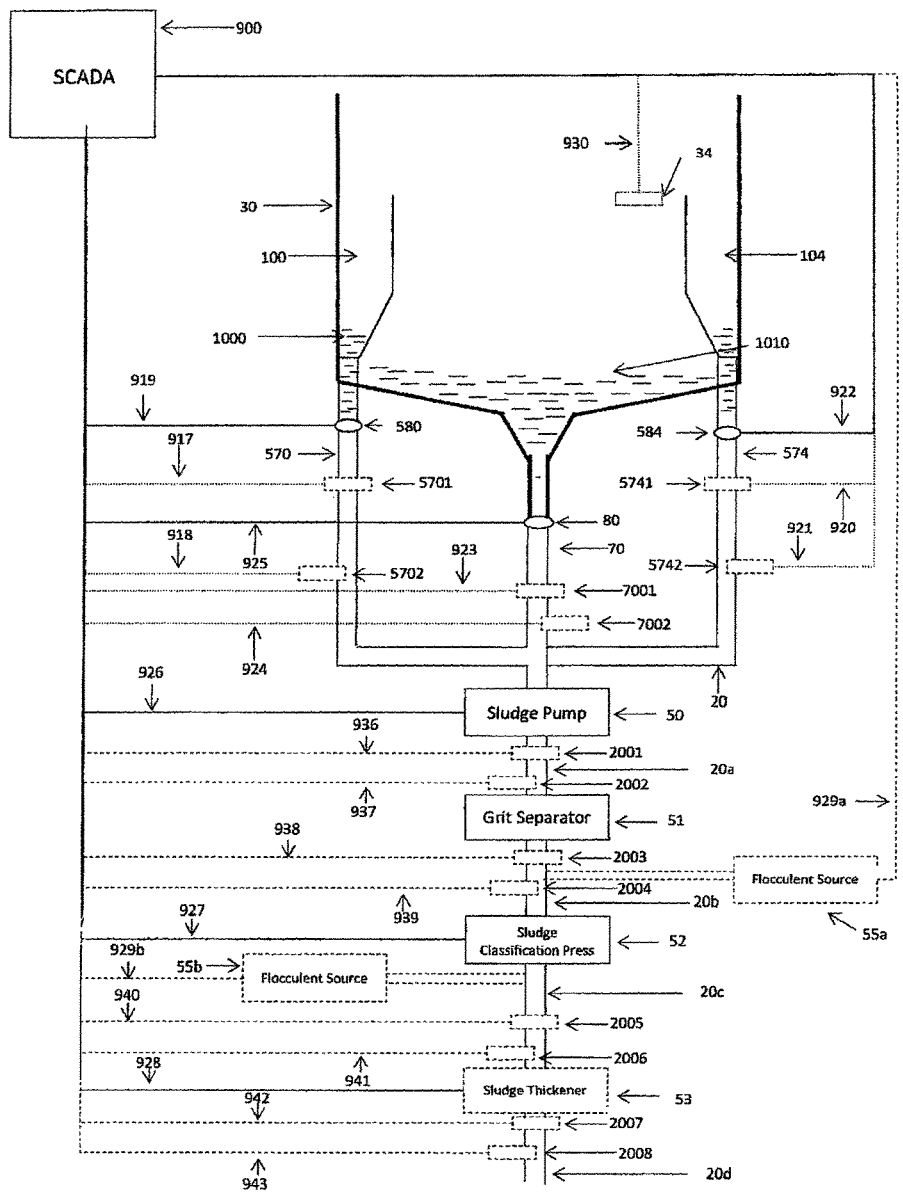
FIG. 5 is a schematic drawing and elevational end view of one embodiment of a clarification tank and IFS in fluid communication with apparatus to treat grit and sludge settled in the clarification tank and IFS in accordance with the present application.

Treatment of Materials Separated from the Influent Stream to Concentrate Biologically-Digestible Materials With reference to FIGS. 2 and 5, grit box 500 of IFS 100 is in fluid communication with discharge pipe 570. Fluid communication via discharge pipe 570 is controlled by valve 580. Valve 580 may be a manually-operated valve. In an alternate embodiment, valve 580 is electronically controlled by a supervisory control and data acquisition SCADA system 900 which provides a signal via communication channel 919 to open and close valve 580. SCADA systems and electronically controlled valves are well known in the art.

With reference to FIG. 5 in one embodiment, IFS 100,104 discharge pipes 570, 574 and clarification tank 30 discharge pipe 70 are in fluid communication with sludge and grit intake pipe 20 which is in fluid communication with sludge pump 50. Sludge pump 50 is in fluid communication with grit separator 51 via pipe 20a. Grit separator 51 is in fluid communication with sludge classification press 52 via pipe 20b. Sludge classification press 52 is in fluid communication with optional sludge thickener 53 via pipe 20c. Sludge thickener 53 is in fluid communication with pipe 20d. Optionally, a flocculent source 55a is arranged to communicate flocculents to sludge prior to treatment by sludge classification press 52. Optionally, a flocculent source 55b is arranged to communicate flocculents to the sludge discharged by sludge classification press 52. In one embodiment, sludge pump 50 is in communication with and controlled by SCADA 900 via communication channel 926. In one embodiment, classification press 52 is in communication with and controlled by SCADA 900 via communication channel 927. In one embodiment, flocculent sources 55a, 55b are in communication with and controlled by SCADA 900 via communication channels 929a, 929b. In one embodiment, sludge thickener 53 is in communication with and controlled by SCADA 900 via communication channel 928.

In one embodiment, one or more optional flowmeters are incorporated in the system: flow meter 5701 to measure the flow in discharge pipe 570; flow meter 5741 to measure the flow in discharge pipe 574; flow meter 7001 to measure the flow in discharge pipe 70; flow meter 2001 to measure the flow in pipe 20a; flow meter 2003 to measure the flow in discharge pipe 20b; flow meter 2005 to measure the flow in pipe 20c; and flow meter 2007 to measure the flow in pipe 20d.

In one embodiment, flow meter 5701 is in communication with SCADA 900 via communication channel 917. In one embodiment, flow meter 5741 is in communication with SCADA 900 via communication channel 920. In one embodiment flow meter 7001 is in communication with SCADA 900 via communication channel 923. In one embodiment, flow meter 2001 is in communication with SCADA 900 via communication channel 936. In one embodiment, flow meter 2003 is in communication with SCADA 900 via communication channel 938. In one embodiment, flow meter 2005 is in communication with SCADA 900 via communication channel 940. In one embodiment, flow meter 2007 is in communication with SCADA 900 via communication channel 942.

In one embodiment, one or more optional sensors are incorporated in the system: sensor 5702 to measure the characteristics of materials in discharge pipe 570; sensor 5742 to measure the characteristics of materials in discharge pipe 574; sensor 7002 to measure the characteristics of materials in discharge pipe 70; sensor 2002 to measure the characteristics of materials in discharge pipe 20a; sensor 2004 to measure the characteristics of materials in discharge pipe 20b; sensor 2006 to measure the characteristics of materials in discharge pipe 20c; and, sensor 2008 to measure the characteristics of materials in discharge pipe 20d. The optional sensors are in communication with SCADA 900: sensor 5702 via communication channel 918; sensor 5742 via communication channel 921; sensor 7002 via communication channel 924; sensor 2002 via communication channel 937; sensor 2004 via communication channel 939; sensor 2006 via communication channel 941; and sensor 2008 via communication channel 943.

Sensors 5702 5742, 7002, 2004, 2006, and 2008 may be a UVAS sensor, turbidity sensor, pH sensor, or any other type of sensor consistent with measuring the physical and/or chemical characteristics of sludge and grits undergoing treatment.

With reference to FIG. 5, sludge 1000 settled in grit box 500 of IFS 100 can be removed via discharge pipe 70. With reference to the exemplary embodiment of FIG. 2, in one embodiment valve 580 is opened and fluid is pumped or gravity fed through pipes 410, 415 to scour the IFS troughs and grit box. In an alternative method for evacuating and scouring the IFS, valve 580 is opened and IFS troughs 201, 202 are scoured with liquid to evacuate solids from the entirety of the IFS. In one embodiment, as part of the ongoing operation of the clarification system 1 of FIG. 1, to selectively classify and separate grits, solids, particulates, and solvated materials from an influent stream, valve 580 is opened to remove the settled materials without concurrent scouring of the IFS.

With reference to FIG. 5, sludge 1000 settled in grit box 500 may have viscosity low enough to flow from the grit box under the influence of gravity. The solids content of the sludge is dependent on the type of solids, the depth of the tank, the methodology of extraction, and how long the sludge is resident in the tank prior to extraction. A representative range for the solids content of materials 1010 is from less than one-tenth of a percent to five percent or more. The head pressure from the influent in IFS 100 may be used to assist in moving sludge 1000 in grit box 500 through discharge pipe 570. In one embodiment, sludge pump 50 is used to assist in the evacuation of materials 1000 settled in grit box 500. In one embodiment, sludge pump 50 is electronically controlled by a supervisory control and data acquisition system SCADA 900 which provides a signal via communication channel 926 to start and stop pumping.

With reference to FIG. 5, sludge 1010 settled in clarification tank 30 can be removed via discharge pipe 70 in liquid communication with the clarification tank 30. Fluid communication via discharge pipe 70 is controlled by valve 80. Sludge 1010 settled in clarification tank 30 can be removed by scouring and cleaning with a fluid as described for example in the '864 patent. In one embodiment, as part of the ongoing operation of clarification system 1 of FIG. 1, to selectively classify and separate grits, solids, particulates, and solvated materials from an influent stream, valve 80 is opened to remove the settled materials.

Sludge 1010, settled in clarification tank 30 may have viscosity low enough to flow from clarification tank 30 under the influence of gravity. The solids content of the sludge is dependent on the type of solids, the depth of the tank, the methodology of extraction, and how long the sludge is resident in the tank prior to extraction. A representative range for the solids content of materials 1010 is from less than one-tenth of a percent to five percent or more. The head pressure from the influent in clarification tank 30 may be used to assist in moving sludge 1010 in the clarification tank 30 through discharge pipe 70. In one embodiment, a sludge pump 50 is used to assist in the evacuation of sludge 1010 settled in clarification tank 30.

Sludge from IFS 100, 104 and clarification tank 30 enters grit separator 51 which separates and removes coarse, dense solids, referred to herein as "grit" or "grits", that are not biologically digestible from the sludge. Grit separator 51 may be a gravity separator as shown with reference to FIG. 6 or a hydro-cyclone as is well known in the art. The removal of grits from the sludge removed from clarification tank 30 and IFS' 100-107 rather than from the influent stream prior to primary clarification provides for improved operation of the grit separator and overall plant reliability.

Figure 6:
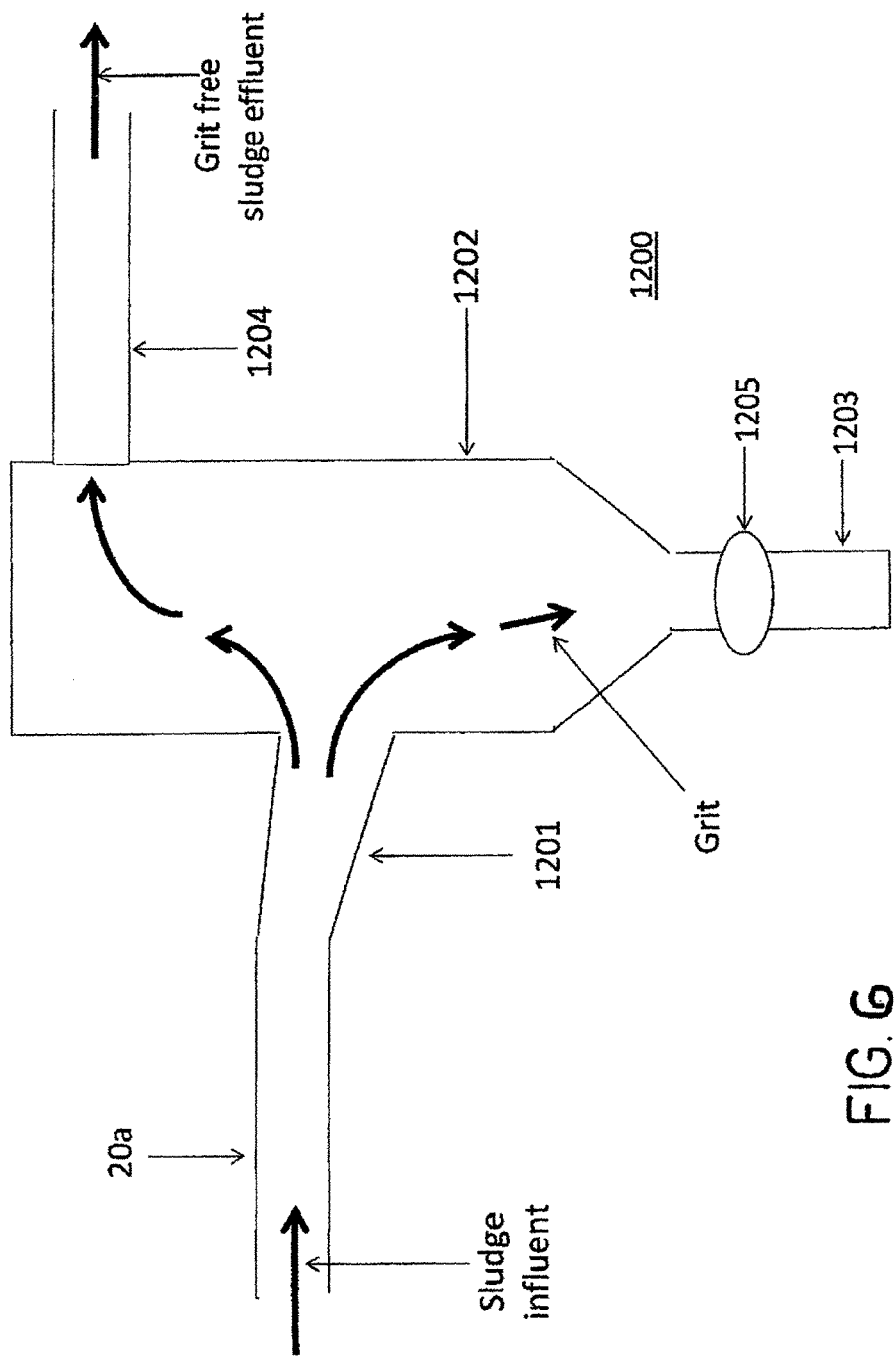
FIG. 6 is a schematic elevational drawing of a grit separator in accordance with the present application.

With reference to FIG. 6, there is shown one embodiment of a grit separator 51 that is a gravity separator 1200 in accordance with the current invention. Gravity separator 1200 has an influent pipe 1201 in fluid communication with a gravity separation chamber 1202. Gravity separation chamber 1202 is in fluid communication with grit discharge pipe 1203 and sludge discharge pipe 1204. Valve 1205 is positioned on grit discharge pipe 1203 and controls fluid communication through pipe 1203. Influent pipe 1201 is arranged to have dimensions perpendicular to the flow of influent sludge substantially larger than the dimensions perpendicular to the flow of influent sludge of pipes providing a source of sludge to be treated for removal of grit. Influent pipe 1201 is arranged to provide a downward direction to the flow of fluids and materials as they enter gravity separation chamber 1202 giving dense solids inertia downward to gently agitate settled solids and to re-suspend any low density organic materials. The bottom of gravity separation chamber 1202 is designed to slope down to grit discharge pipe 1203 to facilitate discharge of grit under the influence of gravity.

In operation, sludge enters gravity separator 1200 from a source such as clarification tank 30 of FIG. 5 via pipe 20a as shown with respect to FIG. 5. The substantially larger dimensions of influent pipe 1201 relative to source pipe 20a in the direction perpendicular to the direction of sludge flow results in a rapid and substantial decrease in sludge flow velocity. The dimensions of gravity chamber 1202 are arranged to provide time for grit to settle in the gravity chamber prior to discharge of the sludge. Periodically valve 1205 is opened to remove accumulated grit from gravity separation chamber 1202. Preferably, valve 1205 is a pinch valve to avoid fouling and failure associated with grit becoming lodged in a valve seat.

With reference to FIG. 5, sludge substantially free from grit exits the grit separator and is fluidly communicated to sludge classification press via pipe 20b. The sludge classification press 52 may be a rotary screw press such as the Strainpress® Sludgecleaner SP manufactured by Huber Technology. In one embodiment, sludge classification press 52 removes all solids larger than 1.6 mm from the sludge. In alternate embodiments, the sludge classification press 52 removes solids with dimensions that range from 0.15 mm to 10 mm. In one embodiment the compression and sheering of the sludge by the sludge classification press 51 releases biologically-digestible material from items such as corn kernels while removing the indigestible or less rapidly digestible materials such as the outer layer of a corn kernel.

After treatment with sludge classification press 52, the solids content of the sludge consists primarily of biologically-digestible materials that can be digested in a digester to produce energy-rich bio-gases such as methane. The removal of materials that are not biologically digestible increases the rate of digestion of the remaining materials, enabling greater throughput and processing of sludge by a digester. The removal of non-digestible materials reduces the frequency with which digesters need to be taken off line and cleaned.

In some applications, it may be desirable to increase the concentration of biologically-digestible material in the sludge after treatment by the sludge classification press 52 and prior to digestion to improve the efficiency of digestion, maintain a low hydraulic retention rate (HRT), and increase the volume of production of bio-gases, such as, by way of example and not limitation, methane. Optionally, a flocculent may be added to the sludge via flocculent source 55 after treatment of the sludge by sludge classification press 52. The flocculent is added to the sludge to create flocs from dissolved and suspended biologically-digestible materials, thereby increasing the concentration of biologically-digestible materials to improve performance of the digesters that digest the resultant sludge. By way of example, in a municipal waste water treatment plant a representative range for the total solids content the sludge after treatment by sludge classification press 52 is between two and three percent, whereas a digester may operate more efficiently with a total solids content of five to seven percent, and some as much as ten percent or more, depending upon the type of digester. Current systems use total solids as a surrogate measure for the concentration of biologically-digestible organic material in sludge. Gas production comes from volatile solids (VS) which are approximately 70-80% percent of the total solids. In one embodiment of the system, the treated sludge from the sludge classification press is fluidly communicated to solids concentrator 53 via pipe 20c. Devices to increase solids content of sludge are well known in the art. By way of example and not limitation, solids concentrator 53 may comprise a gravity deck thickener, rotary drum thickener, or a rotary screw press. Sludge thickener 53 increases the solids content of the sludge treated by sludge classification press 52.

Figure 7:
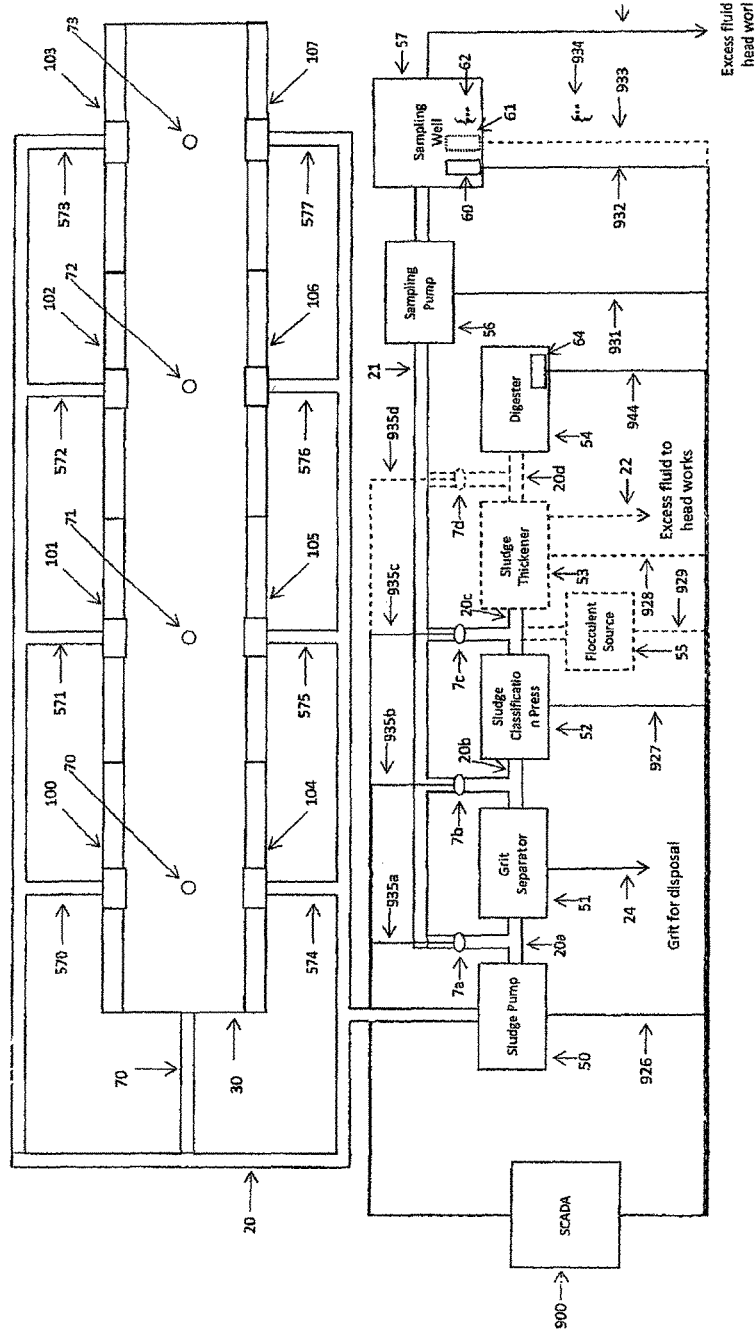
FIG. 7 is a schematic drawing and plan view of an alternative embodiment of a clarification tank and IFS in fluid communication with apparatus to treat grit and sludge settled in the clarification tank and IFS in accordance with the present application.

With reference to FIG. 7, in one embodiment IFS 100-107 discharge pipes 570-577 and clarification tank 30 discharge pipe 70 are in fluid communication with sludge and grit intake pipe 20 which is in fluid communication with sludge pump 50. Sludge Pump 50 is in fluid communication with grit separator 51 via pipe 20a. Grit separator 51 is in fluid communication with sludge classification press 52 via pipe 20b. In one embodiment, sludge classification press 52 is in fluid communication with optional sludge thickener 53 via pipe 20c. Optionally, a flocculent source 55 is arranged to communicate flocculents to sludge traversing pipe 20c. Optional sludge thickener 53 is in fluid communication with digester 54 via pipe 20d and wet well 12 of FIG. 1 via pipe 22. In one embodiment, sludge pump 50 is in communication with and controlled by SCADA 900 via communication channel 926. In one embodiment, sludge pump 52 is in communication with and controlled by SCADA 900 via communication channel 926. In one embodiment, flocculent source 55 is in communication with and controlled by SCADA 900 via communication channel 929. In one embodiment, sludge thickener 53 is in communication with and controlled by SCADA 55 via communication channel 928.

In one embodiment, sludge classification press (SCP) 52 is in fluid communication with digester 54 via pipe 20c.

In one embodiment, digester 54 is an anaerobic digester. Sensor 64 is arranged to measure aspects of the operation of digester 54. Sensor 64 is in communication with SCADA 900 via communication channel 944. Sensor 64 may be one or more of temperature sensors, carbon-dioxide sensors, oxygen sensor, pH sensor, methane sensor, or any other sensor suitable for measuring the physical condition and characteristics, and chemical properties of the materials undergoing digestion.

To optimize overall operations of the system and to detect indications of existing or imminent component or system failure, in one embodiment the characteristics of the sludge are measured by sensor 64 as the sludge is treated. Bacteria in an anaerobic digester thrive best when supplied with food at constant concentration and flow rate. If the rate of organics of solid being supplied to the digester 54 goes outside of the desired ranges as measured by one or more sensors 60, 61, 62, SCADA 900 adjusts the throughput of the sludge classification press 52 as needed. If the organics/solids ratios are too low, as measured by one or more sensors 60, 61, 62, SCADA 900 increases the dosage supplied by flocculent source 55. If the organics/solids ratios are too high, as measured by one or more sensors 60, 61, 62, SCADA 900 decreases or stops the dosage supplied by flocculent source 55. In one embodiment, as single sampling well and set of sensors are used to minimize cost associated with sensors and simplify issues of cross-sensor calibration and correlation across multiple sensors deployed throughout the system.

Sampling pump 56 is in fluid communication with pipes 20a-20d via pipe 21. Sampling pump 56 is preferably a positive displacement pump such as a diaphragm pump or progressive cavity pump in order to prevent fouling. Valves 7a-7d control fluid communication between pipes 20a-20d and pipe 21. In one embodiment, valves 20a-20d are manually operated. In one embodiment, valves 20a-20d are controlled by and in communication with SCADA 900 via communication channels 935a-935d. In one embodiment, sampling pump 56 is controlled by and in communication with SCADA via communication channel 931. Sampling pump 56 is in fluid communication with sampling well 57 via pipe 21. One or more sensors 60,61,62 are arranged in sampling well 57 to measure various characteristics of materials in sampling well 57. The one or more sensors are controlled by and in communication with SCADA 900 via communication channels 932, 933, 934. Sampling well 23 is in fluid communication with wet well 12 of FIG. 1 via pipe 23.

Sludge from IFS 100-107 and clarification tank 30 is treated in a substantially similar manner by sludge pump 50, sludge classification press 52, solids concentrator 53, and flocculent source 55 as described hereinabove with respect to FIG. 5. Upon final treatment of the sludge by sludge classification press 52, or optional sludge thickener 53, as applicable, the sludge is fluidly communicated to digester 54.

Sludge removed from IFS 100-107 and clarification tank 30 is sampled as it is discharged from sludge pump 50 via pipe 20a. In one embodiment, SCADA 900 closes valves 7b, 7c, 7d, opens valve 7a and turns sampling pump 56 on to withdraw sludge via pipe 21. Sludge is pumped via sampling pump 21 to sampling well 57 where one or more sludge characteristics are measured via one or more sensor 60, 61, 62. Upon completion of the measurements, the sludge sample is discharged via discharge pipe 23. In a similar manner, one or more characteristics of grit-free sludge are sampled as the sludge is discharged from grit separator 51 via pipe 20b. In one embodiment, SCADA 900 closes valves 7a, 7c, 7d, opens valve 7b, and turns sampling pump 56 on to Withdraw sludge via pipe 21. Sludge is pumped via sampling pump 21 to sampling well 57 where sludge characteristics are measured via one or more sensors 60,61,62. Upon completion of the measurements, the sludge sample is discharged via discharge pipe 23. One or more characteristics of classified sludge are measured as the sludge is discharged from sludge classification press 52 via pipe 20c. In one embodiment, SCADA 900 closes valves 7a,7b,7d, opens valve 7c and turns sampling pump 56 on to withdraw sludge via pipe 21. Sludge is pumped via sampling pump 21 to sampling well 57 where one or more sludge characteristics are measured via one or more sensors 60,61,62. Upon completion of the measurements, the sludge sample is discharged via discharge pipe 23. One or more characteristics of concentrated sludge are measured as the sludge is discharged from solids concentrator 53 via pipe 20d. In one embodiment SCADA 900 closes valves 7a,7b,7c, opens valve 7d, and turns sampling pump 56 on to withdraw sludge via pipe 21. Sludge is pumped via sampling pump 21 to sampling well 57 where one or more sludge characteristics are measured via one or more sensor 60, 61, 62. Upon completion of the measurements, the sludge sample is discharged via discharge pipe 23.

Figure 8:
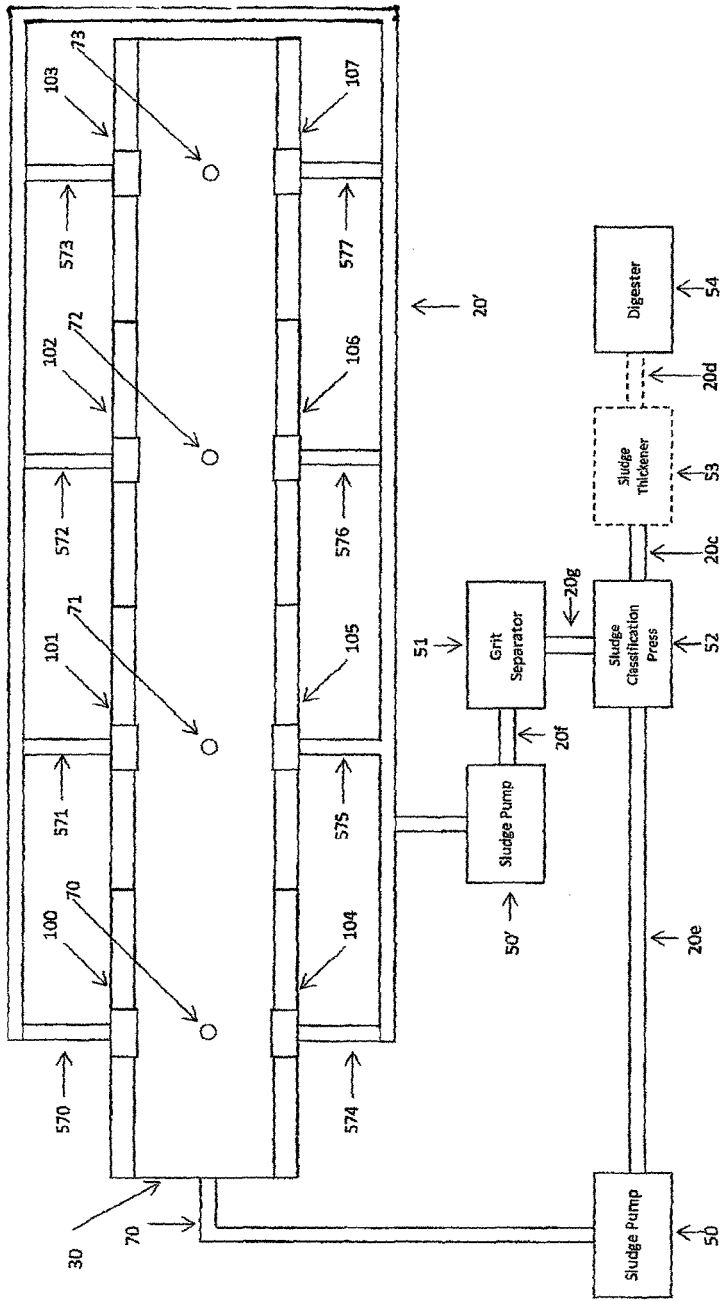
FIG. 8 is a schematic drawing and plan view of another alternative embodiment of a clarification tank and IFS in fluid communication with apparatus to treat grit and sludge settled in the clarification tank and IFS in accordance with the present application.

In an alternate embodiment, and with reference to FIG. 8, only the sludge from IFS' 100-107 is treated by a grit separator as the sludge in clarification tank 30 is substantially free of grits and other dense solids. IFS 100-107 discharge pipes 570-577 are in fluid communication with sludge processing intake pipe 20' and sludge pump 50'. Sludge pump 50' is in fluid communication with grit separator 51 via pipe 20f. Grit separator 51 is in fluid communication with sludge classification press 52 via pipe 20g. Clarification tank 30 discharge pipe 70 is in fluid communication with sludge pump 50. Sludge pump 50 is in fluid communication with grit separator 51 via pipe 20e.

Figure 9:
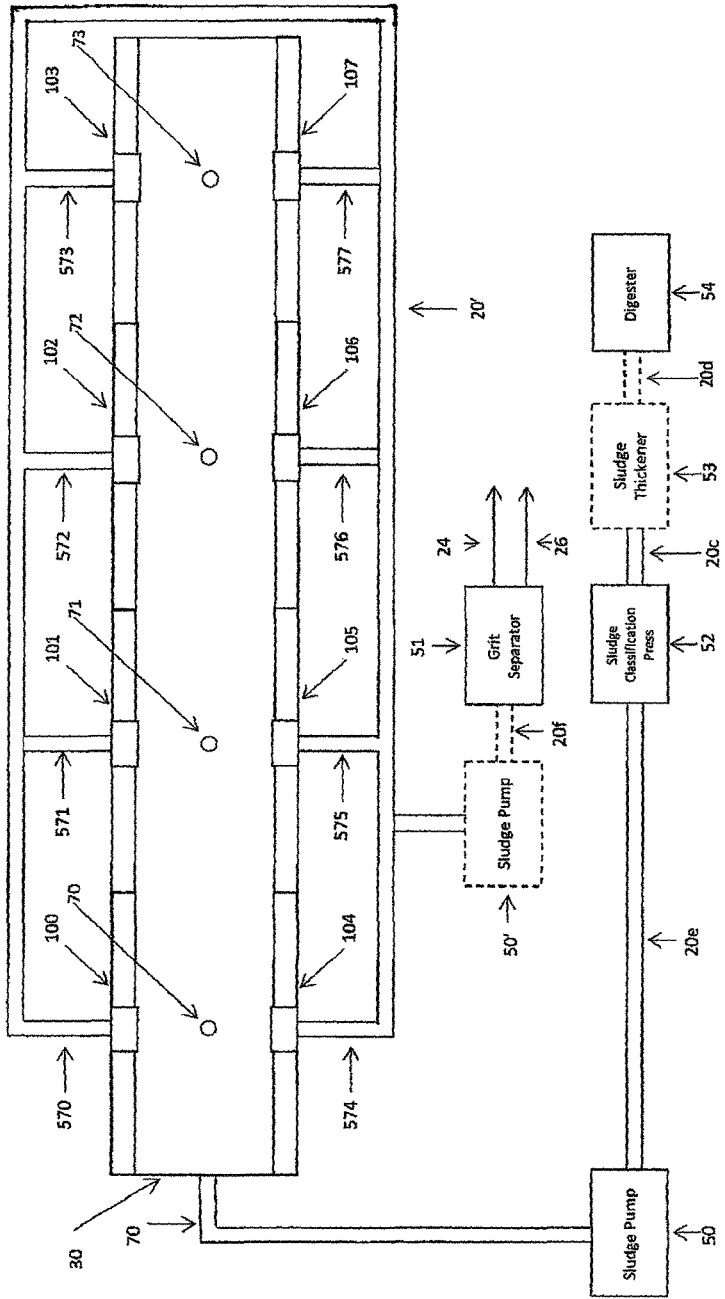
FIG. 9 is a schematic drawing and plan view of another alternative embodiment of a clarification tank and IFS in fluid communication with apparatus to treat grit and sludge settled in the clarification tank and IFS in accordance with the present application.

In an alternate embodiment and with reference to FIG. 9, the content of biologically-digestible materials in sludge from the IFS' 100-107 is insignificant relative to the cost of extraction from the sludge. IFS 100-107 discharge pipes 570-577 are in fluid communication with sludge processing intake pipe 20' and sludge pump 50'. Sludge pump 50' is in fluid communication with grit separator 51 via pipe 20f. Grit separator 51 separates the grits and particulates from the liquid. Liquid and non-particulate, non-grit sludge extracted from the sludge by grit separator 51 are returned to wet well 12 of FIG. 1 via discharge pipe 26, and grit is disposed of in a landfill or by other means.

Figure 10:
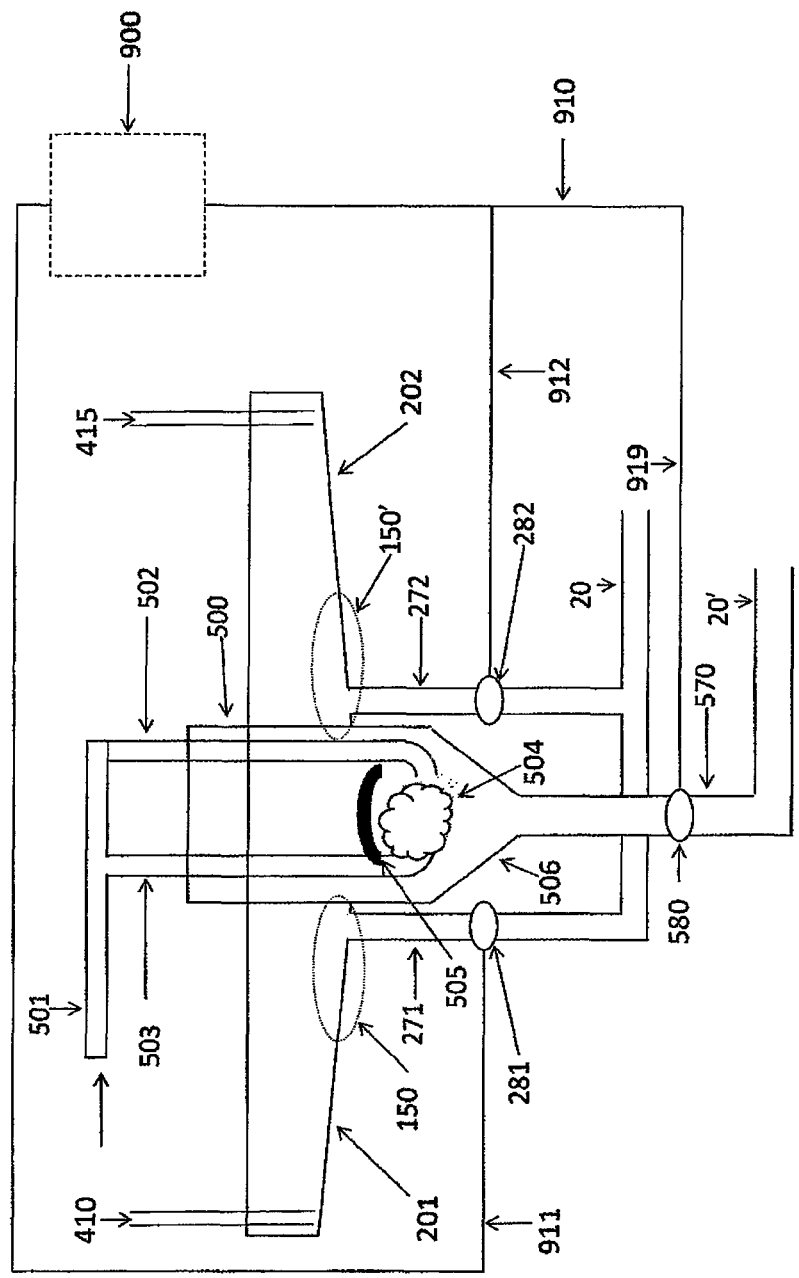
FIG. 10 is an alternative embodiment of an IFS with separate discharge pipes for removing materials from the IFS troughs and grit box.

, In another alternate embodiment, and with reference to FIG. 10 where substantive biologically-degradable material settles in IFS 100 IFS troughs 201,202, but not in IFS 100 grit box 500, IFS trough 201,202 discharge pipes 271,272 may be arranged to be in fluid communication with sludge process intake pipe 20 in communication with sludge pump 50 while grit box discharge pipe 570 is arrange to be in fluid communication with sludge processing intake pipe 20' in fluid communication with sludge pump 51' for further treatment, as shown by way of example and not limitation in FIG. 8 and FIG. 9.

Figure 11:
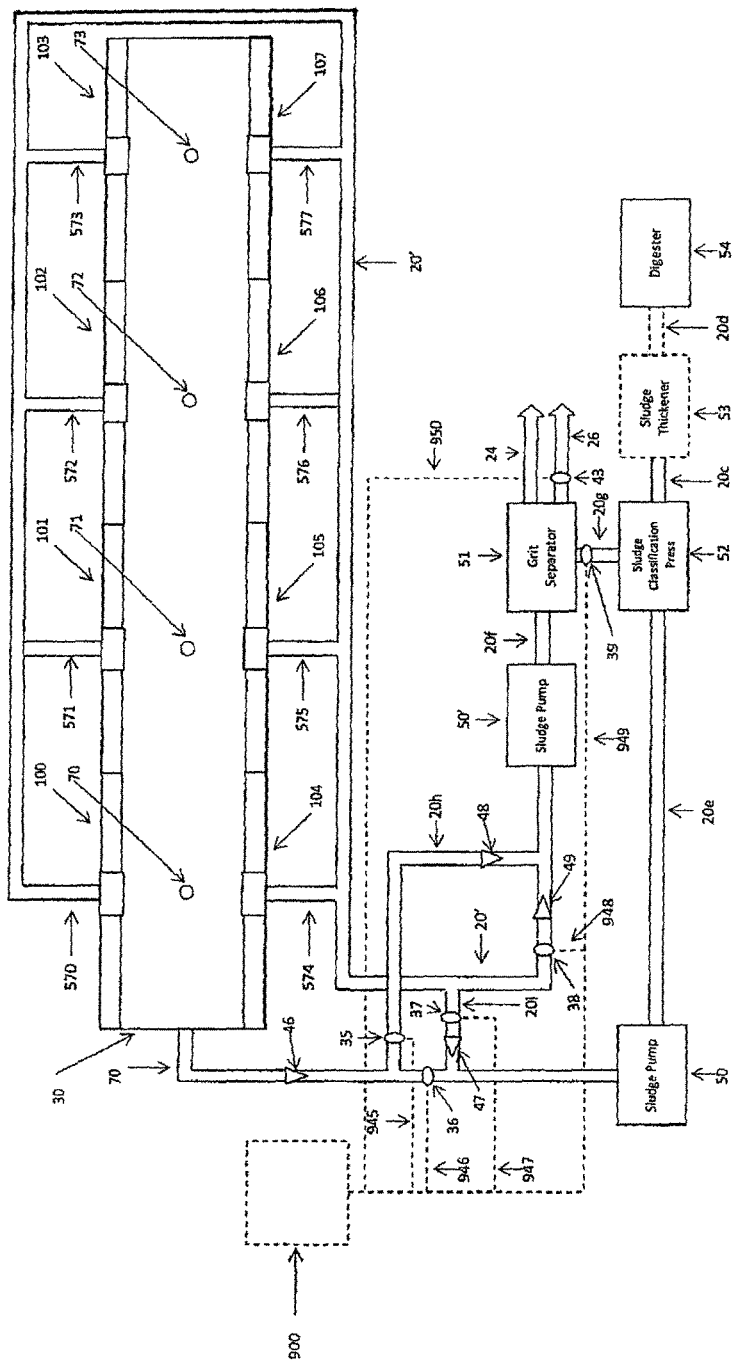
FIG. 11 is a schematic drawing and side elevational view of an IFS arranged to discharge grit and sludge in accordance with the present application.

In a waste water treatment plant, the composition of the sludge settled in the IFS troughs, grit box, and clarification tank can change over time as a result of variations in the composition of the influent, changes in plant operating conditions, and other factors such as temperature and relative humidity. With reference to FIG. 11, to provide flexibility in the treatment of sludge from clarification tank 30, if the sludge has substantially no grit, discharge pipe 70 may be placed in fluid communication with sludge pump 50 by opening valve 36 and closing valve 35, resulting in the sludge bypassing grit separator 51. Check valve 47 prevents the sludge in discharge pipe 70 from entering sludge and grit intake pipe 20' via pipe 20i. Alternatively, if there is a need to separate grit from sludge in clarification tank 30, discharge pipe 70 is placed in fluid communication with sludge pump 50' by opening valve 35 and closing valve 36. Check valve 49 prevents sludge from clarification tank 30 flowing into IFS' 100-107 via sludge and grit intake pipe 20'.

Similarly, to provide flexibility in the treatment of sludge from IFS' 100-107, if the sludge has substantially no grit, sludge and grit intake pipe 20' may be placed in fluid communication with sludge pump 50 by opening valve 37 and closing valve 38, resulting in the sludge bypassing grit separator 51. Check valve 46 prevents the sludge from IFS' 100-107 flowing back into clarification tank 30 via discharge pipe 70. Alternatively, if there is a need to separate grit from sludge in the IFS' 100-107, sludge and intake pipe 20' is placed in fluid communication with sludge pump 50' by opening valve 38 and closing valve 37. Check valve 48 prevents sludge from IFS' 100-107 flowing into clarification tank 30 via discharge pipe 70.

Similarly, in a waste water treatment plant the amount of biologically-degradable material associated with sludge processed by grit separator 51 may change over time as a result of variations in the composition of the influent, changes in plant operating conditions and other factors such as flows from precipitation, snow melt, industrial discharges, and significant public events such as a surge in the use of toilets during Super Bowl halftime.

With reference to FIG. 9, IFS 100-107 discharge pipes 570-577 are in fluid communication with sludge and sludge intake pipe 20' which is in fluid communication with sludge pump 50'. IFS 100-107 discharge pipes 570-577 are in fluid communication sludge pump 50 via sludge and intake pipe 20' which is in fluid communication with pipe 20i which is in fluid communication with clarification tank 30 discharge pipe 70 which is in direct fluid communication with sludge pump 50. Valve 38 is positioned in pipe 20' to control the flow of materials from discharge pipes 570-577 to sludge pump 50' and not to affect the fluid communication of materials between discharge pipes 570-577 and sludge pump 50 and between clarification tank 30 discharge pipe 70 and sludge pump 50 as described hereinbelow. Valve 37 is positioned in pipe 20i to control the flow of materials from IFS 100-107 discharge pipes 570-577 to sludge pump 50. Valve 37 and pipe 20i are arrange to have no effect on the fluid communication between clarification tank 30' discharge pipe 70 and sludge pump 50 and between clarification tank 30 discharge pipe 70 and sludge pump 50'.

Valve 36 is positioned to control the flow of materials in discharge pipe 70 to sludge pump 50 and to have no effect on the fluid communication of materials between pipe 20' and sludge pump 50' or on the fluid communication of materials between discharge pipe 70 and sludge pump 50.

Clarification tank 30 discharge pipe 70 is in fluid communication with sludge pump 50. Clarification tank 30 discharge pipe 70 is in fluid communication with sludge pump 50' via pipe 20h which is communication with pipe 20'. Valve 36 is positioned in discharge pipe 70 to control the fluid communication of materials in discharge pipe 70 with sludge pump 50 and to have no effect on the fluid communication between materials in discharge pipe 70 and sludge pump 50' and to have no effect on fluid communication of materials in discharge pipes 570-577 and sludge pump 50. Valve 35 is positioned in pipe 20h to control the fluid communication of materials in discharge pipe 70 to sludge pump 50' and to have no effect on the fluid communication of materials between discharge pipe 70 and sludge pump 50. Valve 35 and pipe 20h are positioned so as to have no effect on the fluid communication between materials in discharge pipes 570-577 and sludge pump 50' via pipe 20'.

Flap valve 46 is positioned in discharge pipe 70 between clarification tank and valves 35, 36 to prevent the reverse flow of materials in discharge pipe 70 when valves 35 or 36 are opened, preventing the fluid communication of materials between clarification tank 30 and IFS 100-107. Flap valve 47 is positioned in pipe 20i to prevent the reverse flow of materials through pipe 20i when valve 37 is opened, preventing the fluid communication of materials from clarification 30 discharge pipe 70 with sludge pump 50' and IFS troughs 100-107 via pipe 20i. Flap valve 48 is positioned in pipe 20h to prevent the reverse flow of materials through pipe 20h when valve 35 is opened, preventing the fluid communication of materials from IFS troughs 100-107 with clarification tank 30 and sludge pump 50 via pipe 20h. Flap valve 49 is positioned in grit and sludge intake valve 20' to prevent the reverse flow of materials in sludge and intake pipe 20', preventing fluid communication of materials from clarification tank 30 and IFS troughs 100-107.

Sludge pump 50 is in fluid communication with sludge classification press 52 via pipe 20e. Sludge pump 50' is in communication with grit separator 51 via pipe 20f. Grit separator 51 discharges grit-free sludge via pipe 20g and is in communication with sludge classification press 52 via pipe 20g. Alternatively grit separator 51 discharges grit-free pipe via pipe 26 and is in fluid communication with wet well 12 of FIG. 1 via pipe 26. Grit Separator 51 discharges grit via discharge pipe 24. Valve 39 is positioned on pipe 20g to control fluid communication between grit separator 51 and sludge classification press 52. Valve 43 is positioned on pipe 26 to control fluid communication between grit separator 51 and wet well 12 of FIG. 1.

Sludge classification press 52 is in fluid communication with optional sludge thickener 53 via pipe 20c. Optional solids concentrator 53 is in fluid communication with digester 54 via pipe 20d. In one embodiment, sludge thickener is in direct fluid communication with digester 54 via pipe 20c.

Valves 35-39 may be manually operated valves. In one embodiment, valves 35-39 are electronically-controlled valves under control of and in communication with SCADA 900 via communication channels 945-949 respectively. Valves 43 may be a manually operated valve. In one embodiment, valve 43 is an electronically-controlled valve under control of and in communication with SCADA 900 via communication channel 950.

With reference to FIG. 11, to provide flexibility in the treatment of sludge processed by grit separator 51, if the sludge has substantially no biologically-degradable materials, valve 39 providing fluid communication between grit separator 51 and sludge classification press 52 remains closed. Valve 43 is opened and liquid and non-particulate, non-grit sludge extracted from the sludge by the grit separator 51 is returned to wet well 12 of FIG. 1 via discharge pipe 26 and grit is disposed of in a landfill or by other means. If the sludge has substantive biologically-degradable materials, valve 39 providing fluid communication between grit separator 51 and sludge classification press 52 is opened and valve 43 is closed. Liquid and non-particulate, non-grit sludge extracted from the sludge by the grit separator 51 is then treated by sludge classification press 52 and grit is disposed of in a landfill or by other means.

Figure 4:
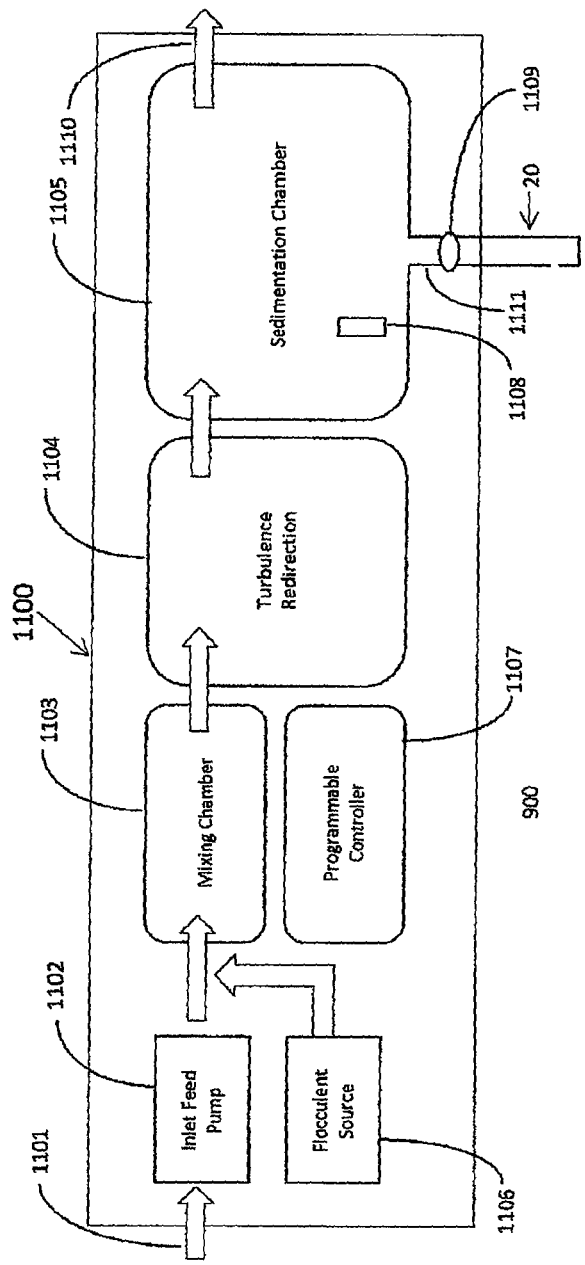
FIG. 4 is a schematic drawing of a prior art primary treatment system suitable for use as a first stage in the present application to collect suspended and solvated BOD.

In one embodiment of the current application, sludge and grit that has not otherwise been separated into components by a primary treatment system is treated to remove grits and other undesirable materials and to separate and concentrate biologically digestible materials. With reference to FIG. 4, discharge pipe 1111 of primary treatment system 1100 is in fluid communication with sludge and grit intake pipe 20 of FIG. 12. In one embodiment, a sludge pump 50 is used to assist in the evacuation of the primary treatment system 1100 sludge. In one embodiment, sludge pump 50 is electronically controlled by a supervisory control and data acquisition system SCADA 900 which provides a signal via communication channel 926 to start and stop pumping.

A sludge treatment system may receive sludge with varying characteristics during its operation. In a waste water treatment system, the characteristics of the sludge may vary due to seasonal and diurnal variations in the characteristics of the influent as well as from periodic and/or isolated events. A storm may result in flushing of grit and particulates from a sewer system connected to the waste water treatment system. An industrial emitter may periodically discharge low grit materials rich in biologically-digestible materials into a sanitary sewer system connected to a waste water treatment plant. Clarification systems such as the prior art CLARI-FLOCCULATOR® system of FIG. 4 may be used to treat sites containing waste water that are remote or otherwise not directly connected to a waste water treatment system. In these circumstances, the sludge produced by treatment of the waste water may need to be transported to a sludge treatment system. It may be desirable to regularly or periodically treat secondary sludge to remove biologically-digestible materials as well as primary sludge. A waste treatment plant may accept food and other wastes with an exceptionally high proportion of biologically-digestible material trucked or otherwise transported directly to the plant. For these and other reasons, it is desirable to have an adaptive, configurable sludge treatment system.

Figure 12:
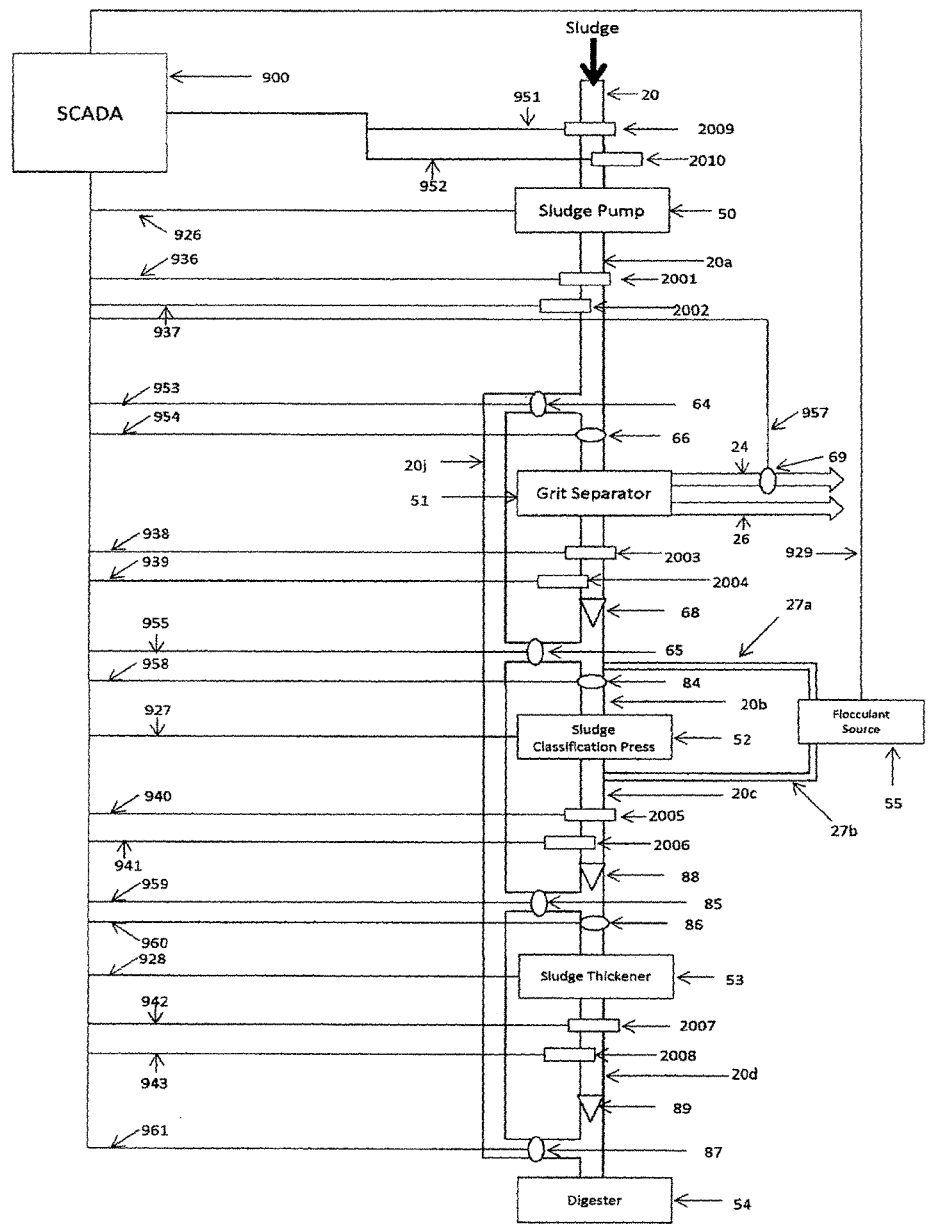
FIG. 12 is a schematic drawing and plan view of an adapative system for treatment of sludge and grit in accordance with the present application.

With reference to FIG. 12, in one embodiment of the current application, sludge enters grit intake pipe 20 which is in fluid communication with sludge pump 50. Sludge pump 50 is in fluid communication with grit separator 51 via pipe 20a. Valve 66 is arranged in line with pipe 20a to control fluid communication to grit separator 51. Grit separator 51 is in fluid communication with sludge classification press 52 via pipe 20b. Valve 84 is arranged in line with pipe 20b to control fluid communication to sludge classification press 52. Sludge classification press 52 is in fluid communication with sludge thickener 53 via pipe 20c. Valve 86 is arranged in line with pipe 20c to control fluid communication to sludge thickener 53. Sludge thickener 53 is in fluid communication with digester 54 via pipe 20d. A flocculent source 55 is arranged to communicate flocculents to sludge prior to being treated by sludge classification press 52 via pipe 27a or alternatively to sludge discharged from sludge classification press 52 via pipe 27b. In one embodiment, sludge pump 50 is in communication with and controlled by SCADA 900 via communication channel 926. In one embodiment, sludge classification press 52 is in communication with and controlled by SCADA 900 via communication channel 927. In one embodiment, flocculent source 55 is in communication with and controlled by SCADA 900 via communication channel 929. In one embodiment, sludge thickener 53 is in communication with and controlled by SCADA 900 via communication channel 928.

In one embodiment, one or more optional flowmeters are incorporated in the system: flow meter 2009 to measure the flow in discharge pipe 20; flow meter 2001 to measure the flow in pipe 20a, flow meter 2003 to measure the flow in discharge pipe 20b; flow meter 2005 to measure the flow in pipe 20c; and flow meter 2007 to measure the flow in pipe 20d. In one embodiment, flow meter 2009 is in communication with SCADA 900 via communication channel 951. In one embodiment, flow meter 2001 is in communication with SCADA 900 via communication channel 936. In one embodiment, flow meter 2003 is in communication with SCADA 900 via communication channel 938. In one embodiment, flow meter 2005 is in communication with SCADA 900 via communication channel 940. In one embodiment, flow meter 2007 is in communication with SCADA 900 via communication channel 942.

In one embodiment, one or more optional sensors are incorporated in the system: sensor 2010 to measure the characteristics of materials in sludge and grit intake pipe 20; sensor 2002 to measure the characteristics of materials in discharge pipe 20*a*; sensor 2004 to measure the characteristics of materials in discharge pipe 20*b*; sensor 2006 to measure the characteristics of materials in discharge pipe 20*c*; and, sensor 2008 to measure the characteristics of materials in discharge pipe 20*d*. The optional sensors are in communication with SCADA 900: sensor 2010 via communication channel 952; sensor 2002 via communication channel 937; sensor 2004 via communication channel 939; sensor 2006 via communication channel 941; and sensor 2008 via communication channel 943.

Sensors 2010, 2004, 2006, and 2008 may be a UVAS sensor, turbidity sensor, pH sensor or solids sensor or any other sensor consistent with measuring the physical and/or chemical characteristics of sludge and grits undergoing treatment.

Pipe 20*a* is in direct fluid communication with pipes 20*a*, 20*b*, 20*c*, and pipe 20*d* via pipe 20*j*. Valve 64 controls fluid communication between pipe 20*a* and pipe 20*j*. Valve 65 controls fluid communication between pipe 20*j* and pipe 20*b*. Valve 85 controls fluid communication between pipe 20*j* and pipe 20*c*. Valve 87 controls fluid communication between pipe 20*j* and pipe 20*d*. Valve 69 controls the communication of grit discharged through grit separator 51 grit discharge pipe 24. In one embodiment, valves 64, 65, 66, 69, 84, 85, 86, 87 are manually controlled. In one embodiment, valves 64, 65, 66, 69, 84, 85, 86, 87 are under the control of and in communication with SCADA 900: valve 64 via communication channel 953, valve 65 via communication channel 955; valve 66 via communication channel 954; valve 69 via communication channel 957; valve 84 via communication channel 958; valve 85 via communication channel 959; valve 86 via communication channel 960; and, valve 87 via communication channel 961.

Check valve 68 is arranged in line with pipe 20*b* to permit flow of fluid from grit separator 51 to sludge classification press 52 and to pipe 20*j* where pipe 20*j* is in fluid communication with pipe 20*b* and while preventing the reverse flow of fluid to grit separator 51. Check valve 88 is arranged in line with pipe 20*c* to permit flow of fluid from sludge classification press 52 to solids concentrator 53 and to pipe 20*j* where pipe 20*j* is in fluid communication with pipe 20*c* while preventing the reverse flow of fluid to sludge classification press 52. Check valve 89 is arranged in line with pipe 20*d* to permit flow of fluid from sludge thickener 53 to digester 54 and to pipe 20*j* where pipe 20*j* is in fluid communication with pipe 20*d* while preventing the reverse flow of fluid to sludge thickener 53.

The system of FIG. 12 operates in substantially the same manner as the corresponding elements of FIG. 5 when valves 64, 65, 85 and 87 are closed and valves 66, 84, 86 and 87 are opened. The system is dynamically configured to optimally and most efficiently separator biological materials from the incoming sludge by a combination of continuous monitoring of the sludge characteristics undergoing treatment and a priori knowledge of the sludge characteristics. By way of example, upon receiving sludge from an industrial beverage or food processing source known to have little grit and high solids content, the sludge treatment system of FIG. 12 may be configured to route material past the grit separator and sludge thickener by closing valves 66 and 84 and opening valves 64, 65, 84, 86 and 87. Upon receiving sludge known to have a great deal of grit, but little biologically-digestible materials, the sludge treatment system of FIG. 12 may be configured to separate grit from the fluid and discharge both by closing valves 64,65 and 84 and opening valve 69.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. Apparatus for separating materials from an influent stream, comprising: a) a primary clarifier including a settling tank; b) a mechanism in communication with said settling tank capable of shearing a sludge portion of said material and forcing said sheared sludge portion through a screen and c) a digester in fluid communication with said screen apparatus arranged to receive said sheared sludge portion.

2. Apparatus in accordance with claim 1 wherein said primary clarifier further comprises an influent feed system including a grit box.

3. Apparatus in accordance with claim 2 further comprising a sludge pump in fluid communication with said settling tank, wherein said sludge pump is also controllably in fluid communication with said mechanism arranged to apply mechanical pressure to force sludge particles in said sheared sludge portion smaller than a predetermined dimension to pass through a said screen apparatus.

4. Apparatus in accordance with claim 1 further comprising a controllable flocculent source in communication with said materials in said influent stream prior to their treatment by said mechanism.

5. Apparatus in accordance with claim 1 further comprising a controllable flocculent source in communication with said materials in said influent stream after their treatment by said mechanism.

6. Apparatus in accordance with claim 1 further comprising at least one flow meter for measuring flow of said materials.

7. Apparatus in accordance with claim 1 further comprising at least one sensor for measuring characteristics of said materials.

8. Apparatus in accordance with claim 1 further comprising at least one sensor for measuring characteristics of bio-gas produced by digestion of materials in said digester.

9. Apparatus in accordance with claim 1 wherein said screen is cylindrical.

10. Apparatus in accordance with claim 1 wherein said screen is a component of a sludge classifying press.

11. Apparatus for separating materials from an influent stream comprising:
a) a primary clarifier including a settling tank arranged to form a sludge by gravitational settling of said influent stream, said sludge including fluid and sludge particles having a range of sizes;
b) a sludge press in fluid communication with said settling tank arrange to receive said sludge, said sludge press having a cylindrical screen and being arranged to apply mechanical pressure to said fluid and said sludge particles to force said fluid and a portion of said sludge particles through said cylindrical screen to create a screened portion of said sludge, wherein individual sludge particles in said screened portion of said sludge all have diameters up to a predetermined diameter; and, c) a sludge digester in fluid communication with said sludge press and arranged to receive said screened portion of said sludge.

12. Apparatus in accordance with claim 11, further comprising a sludge thickener disposed between said sludge press and said sludge digester.

* * * * *